(12) United States Patent
Saidi

(10) Patent No.: US 7,711,028 B2
(45) Date of Patent: May 4, 2010

(54) SPECTRUM SHAPING USING CODE-HOPPING CDMA

(75) Inventor: Ali Saidi, Bedford, MA (US)

(73) Assignee: The MITRE Corporation, McLean, VA (US)

(*) Notice: Subject to any disclaimer, the term of this patent is extended or adjusted under 35 U.S.C. 154(b) by 1142 days.

(21) Appl. No.: 11/194,611

(22) Filed: Aug. 2, 2005

(65) Prior Publication Data
US 2007/0030883 A1 Feb. 8, 2007

(51) Int. Cl.
*H04B 1/00* (2006.01)
(52) U.S. Cl. .................. 375/132; 375/130; 370/320; 370/342; 370/335; 370/441; 370/479
(58) Field of Classification Search .......... 375/132, 375/130; 370/320, 342, 335, 441, 479
See application file for complete search history.

(56) References Cited

U.S. PATENT DOCUMENTS

| | | | | |
|---|---|---|---|---|
| 7,145,954 | B1* | 12/2006 | Pendergrass et al. | 375/247 |
| 2002/0009127 | A1* | 1/2002 | Misra et al. | 375/146 |
| 2006/0215735 | A1* | 9/2006 | Dalmases et al. | 375/146 |
| 2007/0104250 | A1* | 5/2007 | Rice | 375/146 |

OTHER PUBLICATIONS de Clercq, Luc et al., "Mitigation of Radio Interference in xDSL Transmission," IEEE Communications Magazine, Mar. 2000, pp. 168-172.
Luo, Xiliang et al. "Designing Optimal Plus-Shapers for Ultra-Wideband Radios," 2003 IEEE, pp. 349-353.
Parkvall, Stefan, "Variability of User Performance in Cellular DS-CDMA—Long versus Short Spreading Sequences," IEEE Transactions on Communications, vol. 48, No. 7, Jul. 2000, pp. 1178-1187.
Weiss, Timo A. et al., "Spectrum Pooling: An Innovative Strategy for the Enhancement of Spectrum Efficiency," IEEE Radio Communications, Mar. 2004, pp. S8-S14.

* cited by examiner

*Primary Examiner*—David C Payne
*Assistant Examiner*—Zewdu Kassa
(74) *Attorney, Agent, or Firm*—Stern Kessler Goldstein & Fox, P.L.L.C.

(57) ABSTRACT

A method for spectrally shaping a communication signal is provided. The method comprises generating a plurality of spreading codes, assigning a probability to each of the plurality of spreading codes, and modulating the communication signal by hopping between the plurality of spreading codes such that a time-average proportion of time spent using any one of the plurality of spreading codes is equal to the probability assigned to that spreading code.

27 Claims, 9 Drawing Sheets

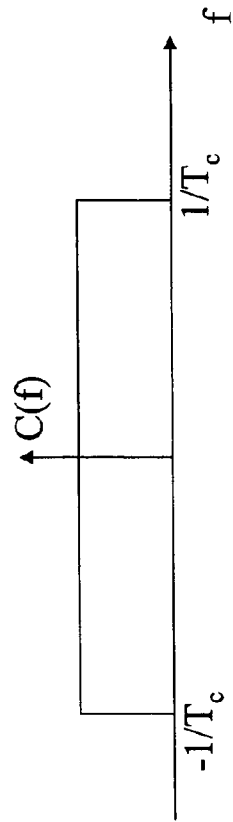
FIG. 2A PN sequence
FIG. 2B Data signal
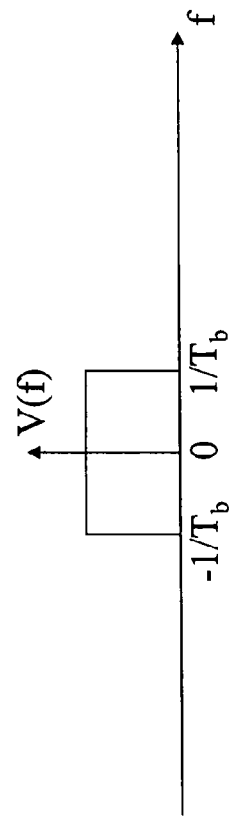
FIG. 2D
FIG. 2E
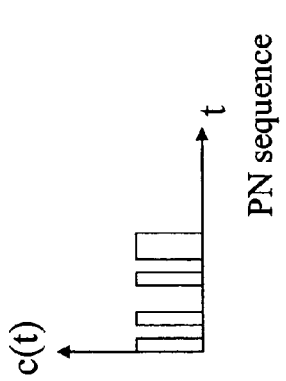
FIG. 2C Spread signal
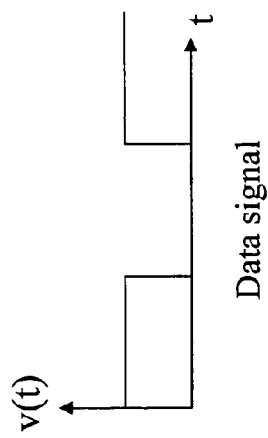
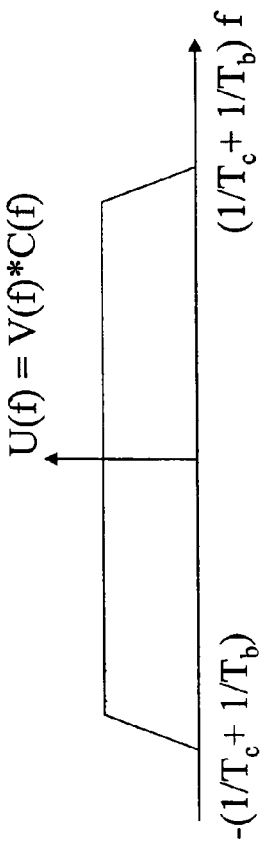
FIG. 2F
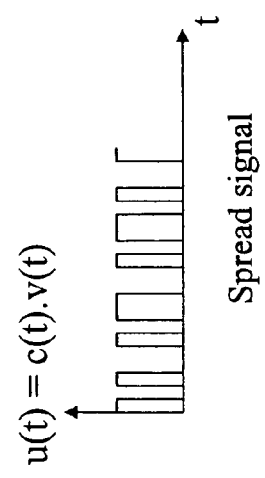

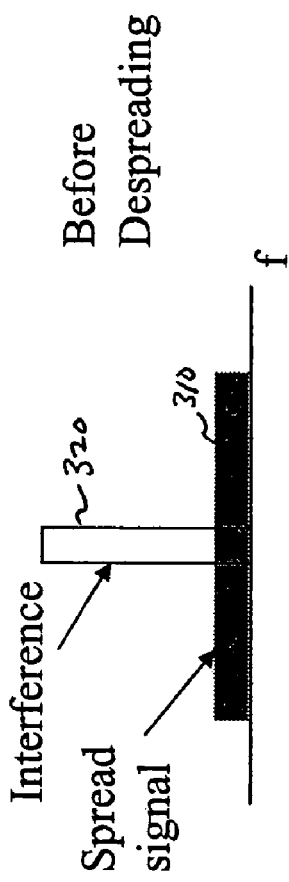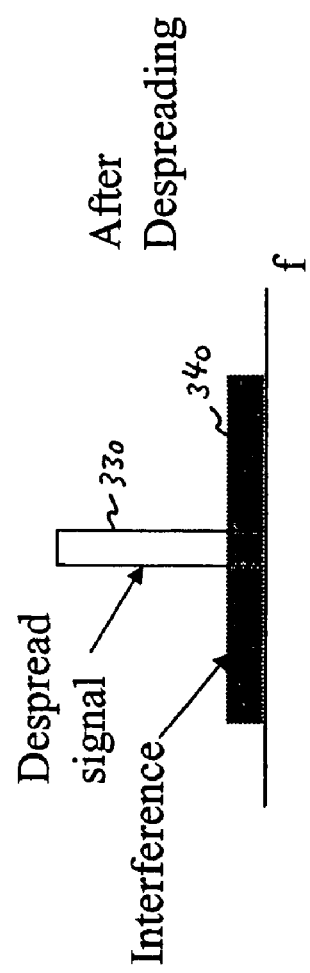
FIG. 3A
FIG. 3B

| Bit period | User 1 | User 2 | User 3 |
|---|---|---|---|
| 1 | $OC_1$ | $OC_2$ | $OC_3$ |
| 2 | $OC_2$ | $OC_4$ | $OC_1$ |
| 3 | $OC_3$ | $OC_1$ | $OC_4$ |
| 4 | $OC_1$ | $OC_3$ | $OC_4$ |
| 5 | $OC_4$ | $OC_2$ | $OC_1$ |
| 6 | $OC_2$ | $OC_1$ | $OC_4$ |
| 7 | $OC_1$ | $OC_4$ | $OC_2$ |
| 8 | $OC_4$ | $OC_3$ | $OC_2$ |
| 9 | $OC_3$ | $OC_4$ | $OC_1$ |
| 10 | $OC_4$ | $OC_1$ | $OC_3$ |

| Code | Probability |
|---|---|
| $OC_1$ | 0.3 |
| $OC_2$ | 0.2 |
| $OC_3$ | 0.2 |
| $OC_4$ | 0.4 |

FIG. 6

SPECTRUM SHAPING USING CODE-HOPPING CDMA

FEILD OF THE INVENTION

The present invention relates generally to a spectrum shaping technique for wireless communication. More particularly, the invention relates to a spectrum shaping technique using code-hopping CDMA.

BACKGROUND OF THE INVENTION

Multiple access (MA) schemes are used to simultaneously share available bandwidth among a plurality of users in a communication system. In conventional MA applications, a finite and contiguous amount of spectrum is designated for a particular system. The use of the spectrum is typically considered unconstrained.

In recent years, however, the increasing demand for ubiquitous computing has resulted in a radio spectrum crowded with users seeking reliable and high bit-rate communication. For example, the Unlicensed National Information Infrastructure (UNII) band at 5.2 GHz contains a wide variety of signals such as microwave ovens, RF tags, cordless telephones, Wireless Local Area Networks (WLANs), Wireless Personal Area Networks (WPANs), etc.

The MA problem has evolved, therefore, to include not only the sharing of spectrum among users of a single system but also the sharing of spectrum among multiple, frequency-adjacent systems. In other words, a MA wireless system must frequently coexist in frequency with numerous, disparate, and uncoordinated interferers.

This coexistence requirement necessitates that a system's signal be spectrally-shaped to limit its interference to signals of wireless systems that exist in the same frequency band.

One common spectrum shaping approach is based on orthogonal frequency division multiple access (OFDMA). Orthogonal frequency division multiplexing (OFDM) distributes data over a large number of OFDM carriers that are spaced apart at precise frequencies.

Accordingly, spectrum shaping in OFDMA is achieved by turning off a set of OFDM carriers at frequencies occupied by existing signals or at which strong interference is present. In practice, however, existing signals or interference are not necessarily centered at OFDM carriers, but can spectrally leak into adjacent frequency bands forcing a large number of the carriers to be turned off. This spectral leakage problem can severely impact the capacity of an OFDMA-based spectrum shaping approach.

What is needed therefore is an efficient spectrum shaping technique for multiple access communication in constrained spectrums.

BRIEF SUMMARY OF THE INVENTION

In one aspect of the invention, a method for spectrally shaping a communication signal is provided. In an embodiment, the method comprises generating a plurality of spreading codes, assigning a probability to each of the plurality of spreading codes, and modulating the communication signal by hopping between the plurality of spreading codes such that a time-average proportion of time spent using any one of the plurality of spreading codes is equal to the probability assigned to that spreading code.

In another aspect of the invention, a multiple access communication method for use in a spectrally-constrained multiple access communication system is provided. In an embodiment, the method comprises generating a plurality of spreading codes, selecting a hopping pattern that defines a time-average proportion of time that each of the plurality of spreading codes will be used to modulate information at each of a plurality of transmitters, modulating information according to the selected hopping pattern to generate a plurality of modulated signals, and transmitting the modulated signals to a receiver such that any two simultaneously transmitted signals are modulated using different spreading codes.

In a further aspect of the invention, a method for spreading a communication signal having a plurality of information bits is provided. In an embodiment, the method comprises selecting a spreading code from a plurality of spreading codes, multiplying a first information bit of the plurality of information bits with the selected spreading code, and repeating the selecting and multiplying steps for each subsequent information bit of the plurality of information bits. In an embodiment, the spreading code is selected according to a pre-determined probability distribution function for selecting spreading codes.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 2A-2F represent an example illustration of the generation of a spread spectrum signal.

FIGS. 3A and 3B illustrate the effect of interference on the demodulation of a desired spread spectrum information signal.

FIG. 6 is an example code-hopping schedule according to the present invention.

The present invention will be described with reference to the accompanying drawings. The drawing in which an element first appears is typically indicated by the leftmost digit(s) in the corresponding reference number.

DETAILED DESCRIPTION OF THE INVENTION

Typical Spread Spectrum Communication Model

Figure 1:
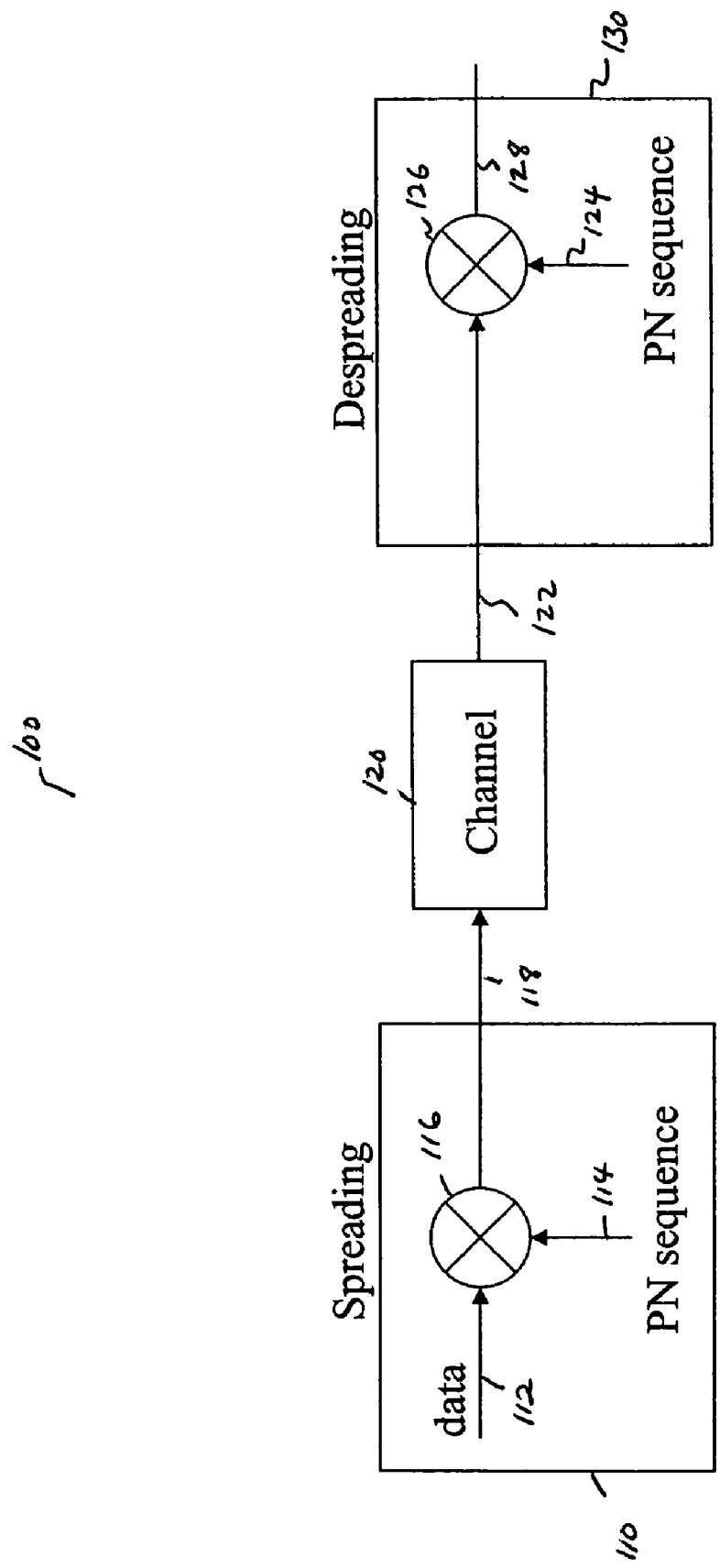
FIG. 1 illustrates a typical spread spectrum communication model.

FIG. 1 is a block diagram that illustrates a typical spread spectrum communication model 100. At the transmitting end, a transmitter 110 modulates an information signal 112 with a pseudo-noise (PN) sequence 114. Typically, information signal 112 and PN sequence 114 are multiplied in the time domain using mixer 116 to generate a modulated signal 118.

PN sequence 114 is typically a binary sequence having a rate much higher than the bit rate of information signal 112. As a result, when modulating information signal 112, PN sequence 114 spreads information signal 112 in the frequency domain. Modulated signal 118 is thus a spread spectrum signal.

Modulated signal 118 is transmitted through wireless channel 120. Due to attenuation and fading effects of wireless channel 120, received signal 122 comprises a modified version of modulated signal 118. Further, received signal 122 contains interference introduced by the wireless channel during transmission.

To undo the spreading at the receiving end, receiver 130 multiplies received signal 122 with a PN sequence 124 using mixer 126 and integrates the result over a bit period. PN sequence 124 is matched to PN sequence 114. In other words, PN sequence 124 is a synchronized replica of PN sequence 114.

Typically, the PN sequence used for spreading is assumed to be known only to the intended receiver. Accordingly, only the intended receiver can demodulate the received signal. De-spread signal 128 is a replica of information signal 112 in the absence of decoding errors.

FIGS. 2A-2F represent an example illustration of the spreading operation described above. In the example, the modulation of a data signal v(t) with a PN sequence c(t) is shown both in the time and frequency domains. In the time domain, PN sequence c(t) (shown in FIG. 2A) repeatedly multiplies each data bit of data signal v(t) (shown in FIG. 2B) to generate a product signal $u(t)=v(t) \times c(t)$ (shown in FIG. 2C).

Typically, data signal v(t) results from pulse modulating a digital information stream with a pulse function having a pulse duration $T_b$. Accordingly, in the frequency domain, the spectrum V(f) of data signal v(t) (shown in FIG. 2E) is approximately $1/T_b$ wide. Similarly, PN sequence c(t) is generated by pulse modulating a pseudo-random binary sequence with a rectangular pulse, also known as a chip, having a pulse duration $T_c$, where $T_c \ll T_b$. Accordingly, the frequency spectrum C(f) of PN sequence c(t) (shown in FIG. 2D) is approximately $1/T_c$ wide and is much wider than the spectrum V(f) of the data signal.

Consequently, the resulting spectrum U(f) of the product signal u(t) (shown in FIG. 2F), which is a convolution of the two spectra V(f)*C(f), is a spread spectrum having a bandwidth approximately equal to $(1/T_c + 1/T_b)$. Product signal u(t) is typically transmitted at a lower power than a non-spread signal such as v(t), because product signal u(t) occupies a wider bandwidth than signal v(t).

One of the main advantages of spread spectrum communication lies in its strong immunity to noise and interference. FIGS. 3A and 3B illustrate the effect of an interfering signal 320 on the demodulation of a desired spread spectrum information signal 310.

Interfering signal 320 typically results from intentional interference, such as adversarial jamming, or unintentional interference, such as multiple-access interference (MAI). FIG. 3A illustrates an example where interfering signal 320 is a narrowband signal compared to spread spectrum information signal 310. Interfering signal 320 may be a wideband signal in other interference scenarios.

The result of de-spreading the aggregate signal comprised of information signal 310 and interfering signal 320 in FIG. 3A is the same, however, regardless of the type or spectrum shape of interfering signal 320. As shown in FIG. 3B, by multiplying the aggregate signal by a synchronized replica of a PN sequence that was used to spread information signal 310, desired information signal 310 is de-spread back to a narrowband signal 330 while any interfering signals are spread over a wide bandwidth. The net effect is a reduction in interference power resulting in an easy capture of the desired information signal.

Conventional CDMA-based Multiple Access Communication System

Due to their interference rejection capabilities, spread spectrum techniques have played a major role in wireless communications over the last decade. Most notably, spread spectrum techniques figure as an essential part in the multiple access communication scheme known as CDMA (Code Division Multiple Access).

Figure 4:
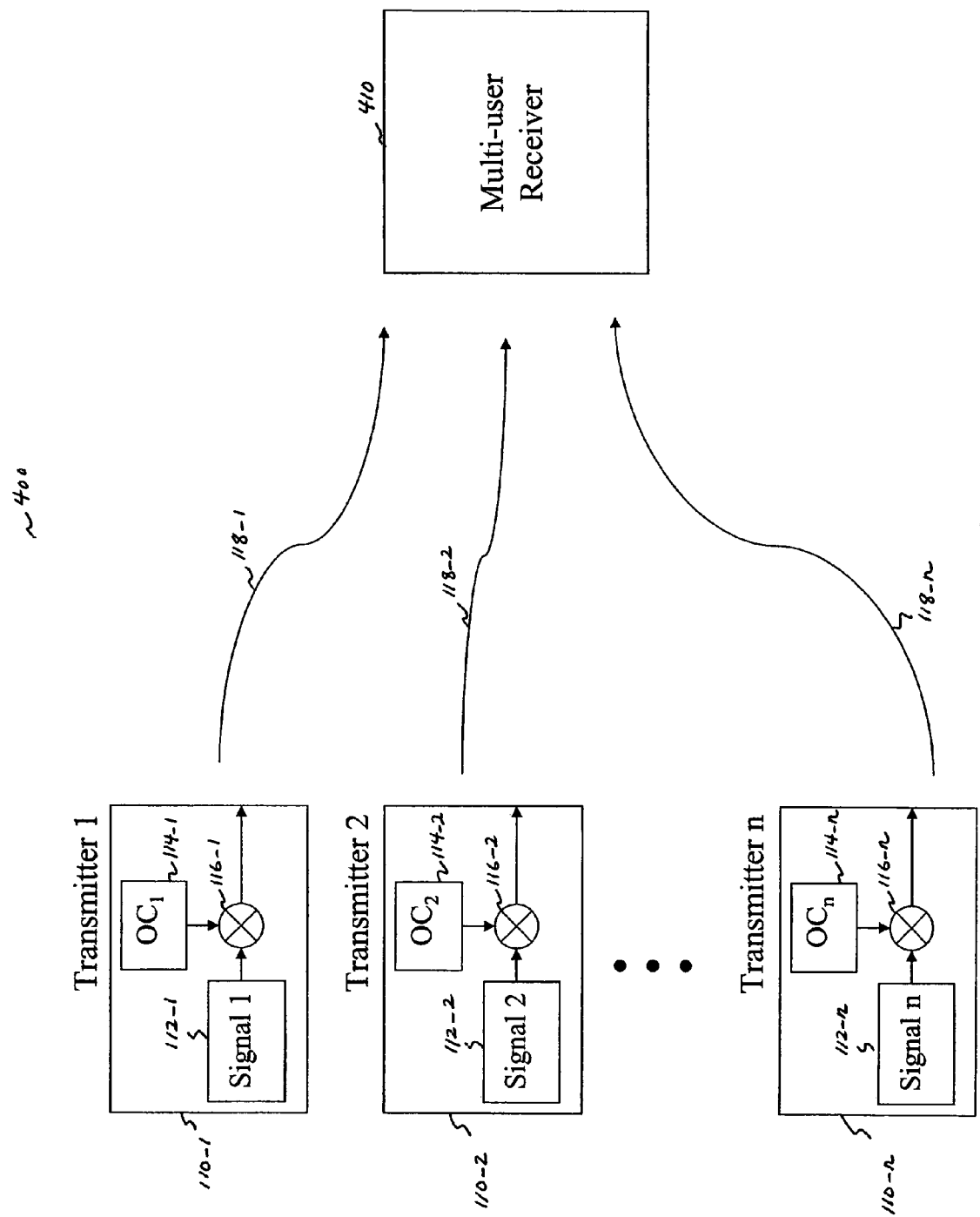
FIG. 4 is a block diagram that illustrates a conventional spread spectrum CDMA-based multiple access communication system.

FIG. 4 is a block diagram that illustrates a conventional spread spectrum CDMA-based multiple access communication system 400. In the system of FIG. 4, a plurality of transmitters 110-(1-n) communicate simultaneously both in time and in frequency with a single multi-user receiver 410. To achieve that communication, each of the plurality of transmitters 110-(1-n) is assigned a unique PN sequence or code for spreading information.

Accordingly, each of a plurality of data signals 112-(1-n), as illustrated in FIG. 4, is spread using a corresponding spreading code 114-(1-n) and a mixer 116-(1-n) to generate a plurality of spread signals 118-(1-n), respectively.

Typically, spreading codes 114-(1-n) are chosen to be pair-wise orthogonal or quasi-orthogonal. In other words, spreading codes 114-(1-n) are characterized by very low cross-correlation between any two of them. Accordingly, when spread signals 118-(1-n) are simultaneously received at multi-user receiver 410, in the form of an aggregate of transmitted signals 118-(1-n), each of data signals 112-(1-n) is recovered by simply multiplying the aggregate signal with the spreading code 114-(1-n) corresponding to that data signal. Indeed, the low cross-correlation of the codes ensures that, in de-spreading any one of data signals 112-(1-n), the other data signals simply reduce to wideband low power interference as described above with reference to FIG. 3.

Effect of Code Length on Spectrum Shape

CDMA spreading codes are divided into short codes and long codes depending on the number of chips per code.

Short codes are 10-128 chips long and typically repeat periodically for each information bit of an information signal. In other words, the same PN sequence multiplies every data symbol of an information signal. As a result, a power spectral density of a short-code spread signal typically has power concentrated at a center frequency and at a few harmonics of that central frequency.

Long codes, on the other hand, are thousands to millions of chips in length and span several data symbols of the information signal. In other words, every data symbol of the information signal is multiplied by a different sub-sequence of the spreading code until the spreading code wraps around. In practice, long codes are designed to not only be orthogonal to each other but also for each code to be orthogonal to itself. In other words, the sub-sequences that make up the long code are also orthogonal to each other.

Accordingly, spreading an information signal using a long CDMA code is equivalent to spreading the signal using short orthogonal codes but multiplying each data symbol of the information signal with a different code.

In the frequency domain, since a long code repeats periodically, equally using every orthogonal sub-sequence thereof, the effect of spreading an information signal using a long CDMA code is to neutralize the spectral shapes of the short orthogonal sub-sequences and to flatten the power spectral density of the spread information signal.

For a plurality of wireless applications, such as low probability of intercept/low probability of detect (LPI/LPD) applications, this spectrum feature of long-code CDMA is desired. Furthermore, being longer and less repetitive than short codes, long CDMA codes provide increased security compared to shorter codes.

On the other hand, long-code spread signals are not easily spectrally shaped, and with the increased demand for spectrum sharing and co-existence among systems that use adjacent non-contiguous spectra, solutions based on long-code spread spectrum CDMA become increasingly less favorable.

It is therefore an object of the present invention to provide an effective multiple access solution that inherits the security advantages of long-code CDMA but also addresses the intricate spectrum sharing requirements in today's increasingly constrained radio spectrum.

Code-Hopping CDMA-based Multiple Access Communication System

Figure 5:
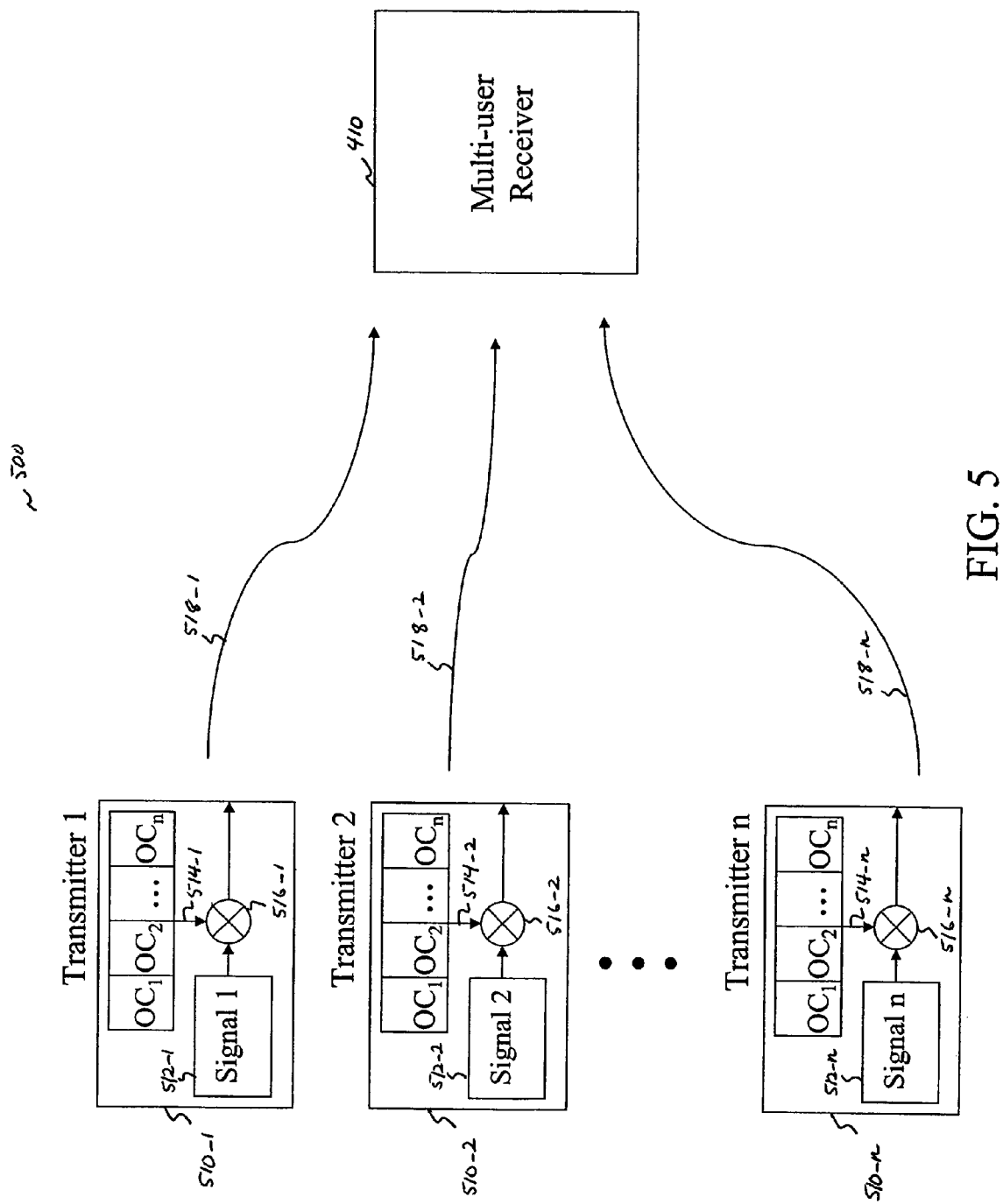
FIG. 5 is a block diagram that illustrates a code-hopping CDMA-based multiple access communication system according to the present invention.

FIG. 5 is a block diagram that illustrates a code-hopping CDMA-based multiple access communication system 500 according to the present invention. Similar to the conventional CDMA scenario of FIG. 4, a plurality of transmitters 510-(1-n) are communicating simultaneously in time and in frequency with a single multi-user receiver 410.

Unlike in the conventional CDMA system, however, each of the plurality of transmitters 510-(1-n) is allowed to choose from a plurality of orthogonal codes $OC_1, \ldots, OC_n$, rather than a single code, to spread respective information signal 512-(1-n). Accordingly, information signal 512-(1-n) is multiplied with a selected one 514-(1-n) of the plurality of spreading codes using a mixer 516-(1-n), to generate a spread signal 518-(1-n).

In an embodiment of the present invention, a spreading code is selected on a data symbol basis to spread the information signal. In other words, rather than selecting a code once to spread the entire information signal, a spreading code is selected for every data symbol of the information signal.

Accordingly, a spreading code is selected for the duration of one data symbol of the information signal before another spreading code is selected for the duration of the next data symbol. This is known as coding-hopping CDMA.

A code-hopping pattern governs the code selection process. The code-hopping pattern determines the frequency in time that a spreading code is used. When the code-hopping pattern is random, the system selects spreading codes with equal probability. As such, the system, as described above, is equivalent to a long-code CDMA system over the span of one spreading code. The resulting spectrum of the information signal is therefore flat.

On the other hand, when spreading codes are selected with non-uniform probabilities, the spectrum of the information signal can be biased to reflect spectrum components of certain codes more than others. It is an object of the present invention to exploit this property of code-hopped CDMA signals to shape the information signal spectrum as desired.

In one aspect of the present invention, a method for spreading a communication signal is provided. The method comprises, for each information bit of the communication signal, selecting a spreading code from a plurality of spreading codes and multiplying the information bit with the selected spreading code. In an embodiment, codes are selected according to a pre-determined probability distribution function (pdf) for code selection.

The code selection pdf assigns for each spreading code of the plurality of spreading codes a probability that that spreading code will be selected. Each spreading code, when selected, is used for the duration of one information bit. Accordingly, the probability of selection of each spreading code corresponds to the time-average proportion of time that that spreading code is used. In an embodiment, the spreading codes are short code CDMA sequences.

In another aspect of the present invention, the spreading codes are pairwise orthogonal or quasi orthogonal allowing for the above-described code-hopping spreading method to be used in a code-hopping CDMA-based multiple access scheme.

Referring to FIG. 5 for illustration, each of transmitters 510-(1-n) uses the same code-hopping pattern to communicate with multi-user receiver 410. In other words, spreading codes $OC_1, \ldots, OC_n$ are used by transmitters 510-(1-n) according to a common probability distribution function. To ensure proper decoding at multi-user receiver 410, however, code orthogonality must be maintained between simultaneously transmitted signals 518-(1-n).

In an embodiment, a code usage schedule is used to ensure that no two simultaneously transmitted signals are spread using the same spreading code. FIG. 6 illustrates an example code usage schedule 600 for using four codes $OC_1, \ldots, OC_4$ in a three-user system. The code usage schedule defines code usage over the span of a pre-defined cycle for each information bit period. Furthermore, the code usage schedule ensures conformance to the code-hopping pattern, as defined by the code selection pdf, shown in table 610.

Figure 7:
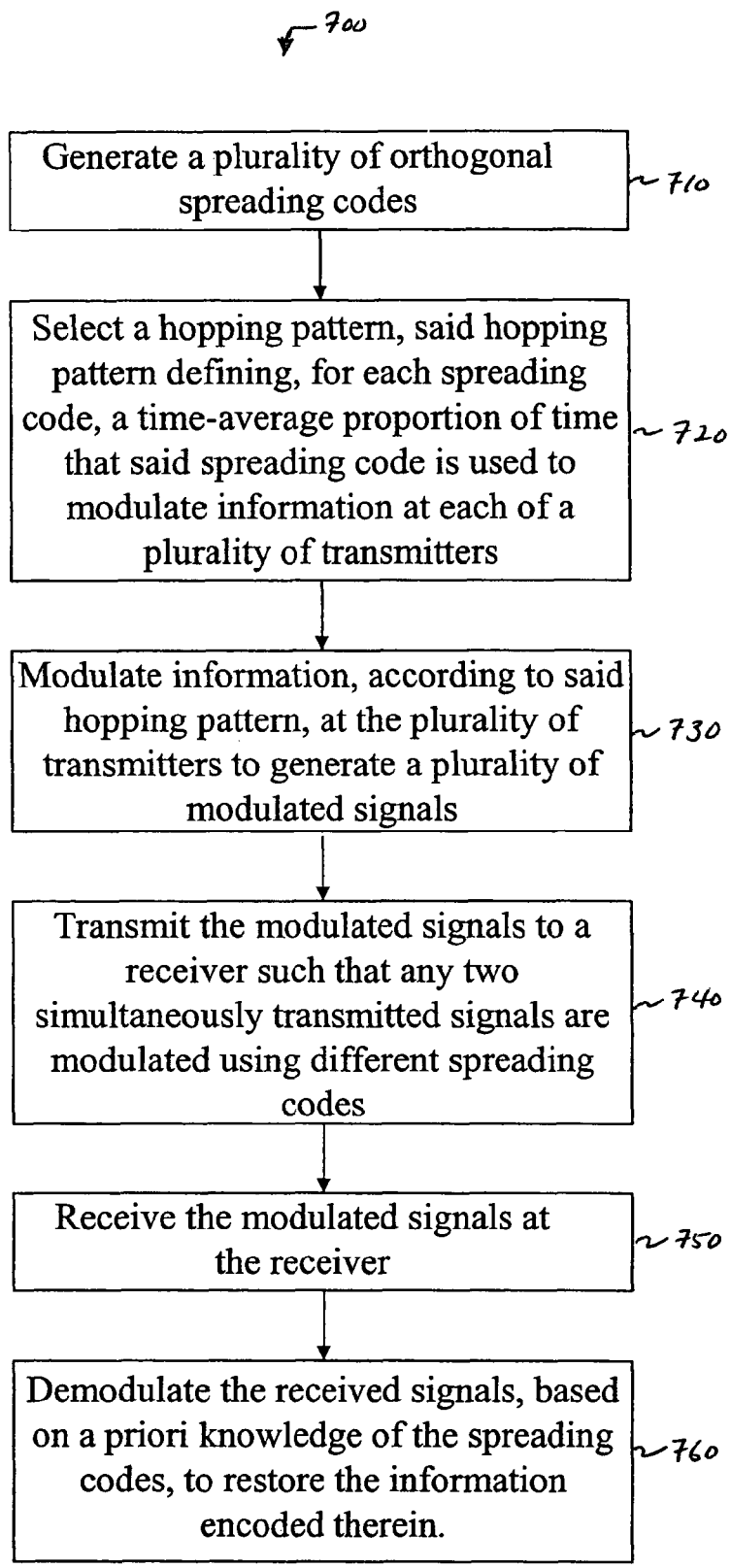
FIG. 7 is a flowchart that illustrates a code-hopping CDMA-based multiple access method according to the present invention.

FIG. 7 is a flowchart 700 that illustrates an embodiment of the code-hopping CDMA-based multiple access method of the present invention. In step 710, a plurality of orthogonal spreading codes are generated. In step 720, a code hopping pattern is selected, wherein said code hopping pattern defines, for each spreading code of the plurality of spreading codes, a time-average proportion of time that that spreading code is used to modulate information at each of a plurality of transmitters. In step 730, information is modulated, according to the selected hopping pattern, at each of the plurality of transmitters to generate a plurality of modulated signals. In step 740, the plurality of modulated signals are transmitted to a receiver while ensuring that any two simultaneously transmitted signals are modulated using different spreading codes. In step 750, the receiver simultaneously receives the transmitted modulated signals, and, based on a priori knowledge of the spreading codes, demodulates each of the received signals, in step 760, to restore the information encoded therein.

Figure 8:
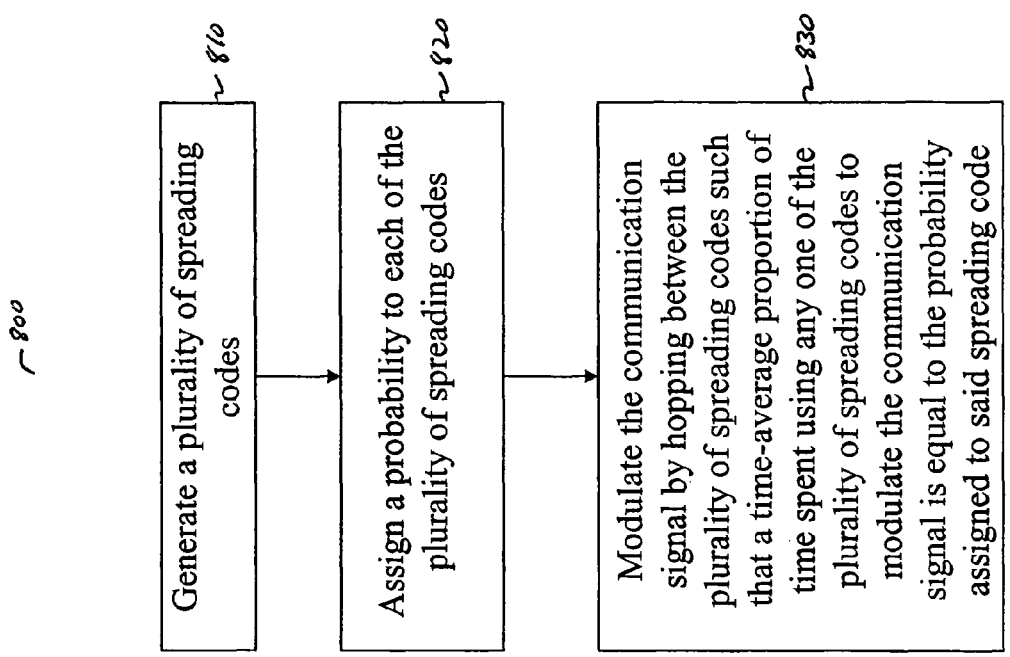
FIG. 8 is a flowchart that illustrates a method for spectrally shaping a communication signal according to the present invention.

As described above, the spectrum of the transmitted signals is dependent on the selected hopping pattern. Accordingly, in embodiments of the present invention, the hopping pattern is selected to conform the spectrum of the transmitted signals to an allocated frequency band, thereby minimizing interference to adjacent frequency bands. For example, signals of an 802.11 WLAN system can be spectrally shaped using the present invention to provide them with sufficient frequency separation from an existing cordless phone system in the ISM (Industrial, Science, and Medical) 2.4 GHz band. A method for spectrally shaping a communication signal according to the present invention is further discussed below.

Spectrum Shaping Using Weighted Code-Hopping CDMA FIG. 8 is a flowchart that illustrates a method 800 for spectrally shaping a communication signal according to the present invention. In step 810, a plurality of spreading codes are generated. In an embodiment, the spreading codes are short-code CDMA sequences.

In step 820, a probability is assigned to each of the plurality of spreading codes. In an embodiment, the probability represents the probability that the spreading code will be selected to modulate an information bit of the communication signal.

In step 830, the communication signal is modulated by hopping between the plurality of spreading codes such that a time-average proportion of time spent using any one of the plurality of spreading codes to modulate the communication signal is equal to the probability assigned to that spreading code.

Accordingly, in embodiments of the present invention, the power spectral density function of the modulated communication signal is a weighted sum of the power spectral density functions of the individual spreading codes, wherein the weight of each spreading code in the weighted sum corresponds to the selection probability assigned to that spreading code.

As can be understood by a person skilled in the relevant art, therefore, the spectrum shaping method of the present invention allows for spectrally shaping the modulated communication signal by varying the probabilities assigned to the spreading codes. Accordingly, the shape of a pulse function used to pulse modulate the communication signal prior to code modulation can be kept constant.

In an embodiment of the present invention, the spectrum of the communication signal is shaped to approximate a desired spectrum by biasing the probabilities toward spreading codes having desired spectrum components and away from spreading codes having undesired spectrum components. For example, in order to minimize adjacent-band interference, the probabilities can be biased toward spreading codes that provide sufficient spectral separation from signals in adjacent communication bands.

In another embodiment, the method of the present invention reduces to long-code spread spectrum modulation by assigning an equal probability to each of the plurality of spreading codes. The spectrum of the modulated communication signal is, as a result, flattened.

Example Illustration of Spectrum Shaping Using Length-4 WH Codes

Figure 9:
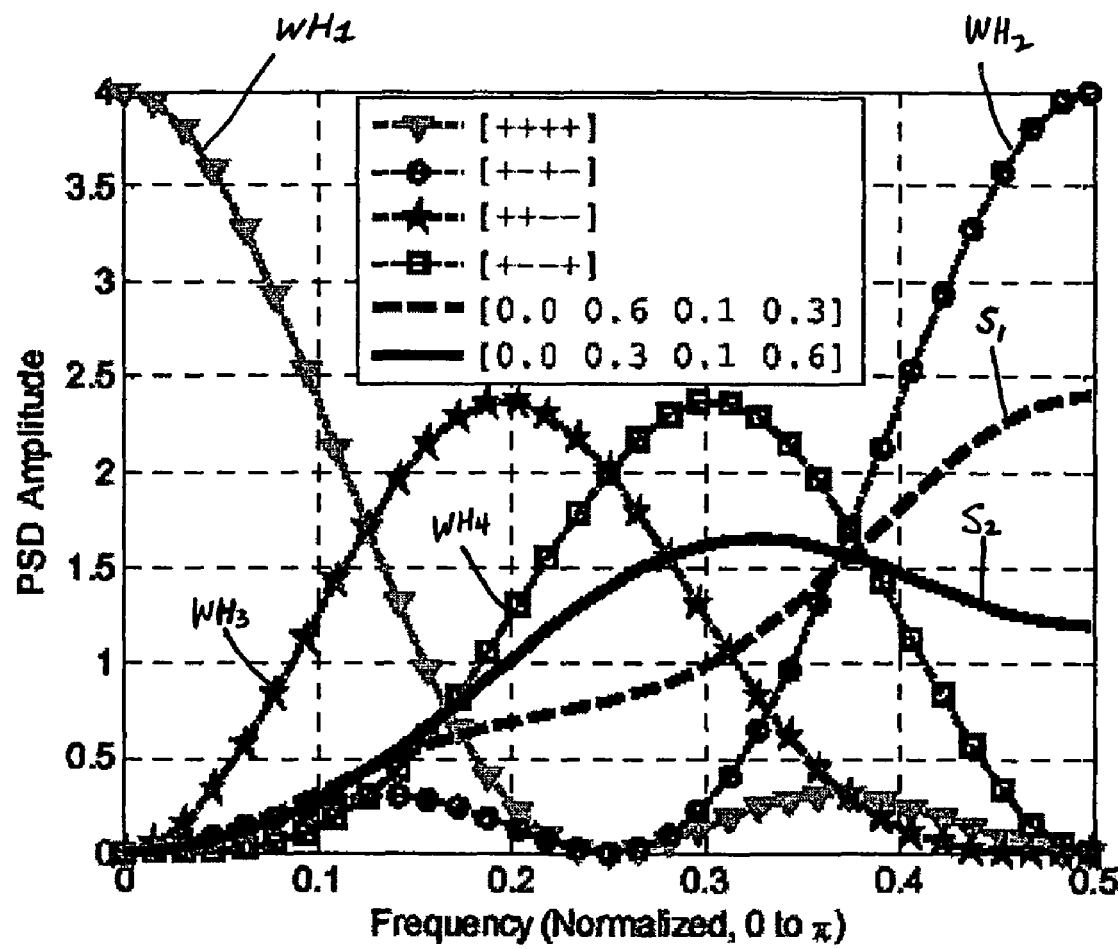
FIG. 9 is an example illustration of spectrum shaping using length-4 Walsh Hadamard (WH) codes according to the present invention.

FIG. 9 is an example illustration of spectrum shaping using length-4 Walsh Hadamard (WH) codes according to the present invention. Orthogonal WH codes $WH_1, \ldots, WH_4$ {1 1 1 1, 1 −1 1 −1, 1 1 −1 −1, 1 −1 −1 1} generate distinct power spectral density (PSD) functions as shown in FIG. 9.

In an example, a desired PSD has a highpass shape with a null at and near DC. From FIG. 9, the PSDs of the first and third codes $WH_1$ and $WH_3$ contain considerable power at or near DC, and are therefore undesirable. On the other hand, the second and fourth codes $WH_2$ and $WH_4$ comprise desired high frequency components.

PSD signals $S_1$ and $S_2$ result from using the codes $WH_1, \ldots, WH_4$ with the code hopping probability vectors $P_1$=[0.0 0.6 0.1 0.3] and $P_2$=[0.0 0.3 0.1 0.6], respectively. In other words, signal $S_1$ is generated by modulating using the second code $WH_2$ 60% of the time, the third code $WH_3$ 10% of the time, and the fourth code $WH_4$ 30% of the time. Similarly, signal $S_2$ is generated by modulating using the second code $WH_2$ 30% of the time, the third code $WH_3$ 10% of the time, and the fourth code $WH_4$ 60% of the time. $S_1$ and $S_2$ both approximate the desired PSD.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for spectrally shaping a communication signal, comprising:
   (a) generating a plurality of spreading codes using a spreading code generator; and
   (b) modulating the communication signal by hopping between the plurality of spreading codes such that a time-average proportion of time spent using a spreading code of the plurality of spreading codes to modulate the communication signal is equal to a respective probability associated with said spreading code, wherein said respective probability is determined according to a probability distribution function, and wherein said respective probability is independent of whether said spreading code had previously been used to modulate the communication signal.

2. The method of claim 1, wherein the plurality of spreading codes are short-code CDMA sequences.

3. The method of claim 1, wherein the respective probability associated with said spreading code represents the probability that the spreading code will be selected to modulate an information bit of the communication signal.

4. The method of claim 3, wherein a power spectral density function of the communication signal is a weighted sum of power spectral density functions of the plurality of spreading codes, wherein code weights in said weighted sum correspond respectively to respective probabilities associated with the plurality of spreading codes.

5. The method of claim 4, wherein the spectrum of the communication signal is shaped by varying the respective probabilities associated with the plurality of spreading codes.

6. The method of claim 5, wherein the spectrum of the communication signal is shaped without varying the shape of a pulse function used to pulse modulate the communication signal prior to code modulation in step (b).

7. The method of claim 5, wherein the spectrum of the communication signal is shaped to approximate a desired spectrum by biasing the respective probabilities toward spreading codes having desired spectrum components and away from spreading codes having undesired spectrum components.

8. The method of claim 7, wherein the desired spectrum components are selected to provide sufficient spectral separation between the communication signal and signals in adjacent communication bands, thereby minimizing adjacent-band interference.

9. The method of claim 5, wherein the spectrum of the communication signal is flattened by setting the respective probabilities associated with the plurality of spreading codes to be equal.

10. A method for spreading a communication signal having a plurality of information bits, comprising:
   (a) selecting a spreading code from a plurality of spreading codes;
   (b) multiplying a first information bit of said plurality of information bits with the selected spreading code using a mixer; and
   (c) repeating steps (a) and (b) for each subsequent information bit of said plurality of information bits,
   wherein the spreading code is selected according to a pre-determined probability distribution function for selecting spreading codes,
   wherein a spreading code to be multiplied with a second information bit is unknown when said spreading code for said first information bit was selected in step (a),
   wherein the pre-determined probability distribution function determines for each spreading code of said plurality of spreading codes a respective probability that said spreading code will be selected to modulate the communication signal.

11. The method of claim 10, wherein the spreading code is selected for a duration equal to an information bit period.

12. The method of claim 10, wherein the spreading codes are pairwise orthogonal.

13. The method of claim 10, wherein the spreading codes are pairwise quasi-orthogonal.

14. The method of claim 10, wherein the spreading codes are short-code CDMA sequences.

15. A multiple access communication method for use in a spectrally-constrained multiple access communication system, the method comprising:
   (a) generating a plurality of spreading codes using a spreading code generator;
   (b) selecting a hopping pattern, said hopping pattern determining, for each spreading code, a respective probability that said spreading code will be used to modulate information at each of a plurality of transmitters, wherein said respective probability is determined according to a pre-determined probability distribution function, and wherein said respective probability is independent of whether said spreading code had previously been used to modulate the communication signal;
   (c) modulating information, according to said hopping pattern, at the plurality of transmitters to generate a plurality of modulated signals; and
   (d) transmitting the modulated signals to a receiver such that any two simultaneously transmitted signals are modulated using different spreading codes.

16. The method of claim 15, further comprising:
   (e) receiving the modulated signals at the receiver; and
   (f) demodulating the received signals, based on a priori knowledge of the spreading codes, to restore the information encoded therein.

17. The method of claim 15, wherein the spectrum of the transmitted signals is dependent on the selected hopping pattern.

18. The method of claim 17, wherein the hopping pattern is selected to conform the spectrum of the transmitted signals to an allocated frequency band, thereby minimizing interference to adjacent frequency bands.

19. The method of claim 16, wherein the spreading codes are short-code CDMA sequences.

20. The method of claim 16, wherein the spreading codes are pairwise orthogonal or pairwise quasi-orthogonal.

21. A transmitter, comprising:
   a spreading code generator that generates a plurality of spreading codes; and
   a modulator that modulates a communication signal by hopping between the plurality of spreading codes such that a time-average proportion of time spent using a spreading code of the plurality of spreading codes to modulate the communication signal is equal to a respective probability associated with said spreading code, wherein said respective probability is determined according to a probability distribution function, and wherein said respective probability is independent of whether said spreading code had previously been used to modulate the communication signal.

22. The transmitter of claim 21, wherein the plurality of spreading codes are short-code CDMA sequences.

23. The transmitter of claim 21, wherein the spectrum of the communication signal is shaped by varying respective probabilities associated with the plurality of spreading codes.

24. The transmitter of claim 23, wherein the spectrum of the communication signal is shaped to approximate a desired spectrum by biasing the respective probabilities toward spreading codes having desired spectrum components and away from spreading codes having undesired spectrum components.

25. A transmitter, comprising:
   means for selecting a first spreading code from a plurality of spreading codes; and
   a modulator that multiplies a first information bit of a communication signal with the selected first spreading code;
   wherein the first spreading code is selected according to a pre-determined probability distribution function for selecting spreading codes,
   wherein the pre-determined probability distribution function determines for each spreading code of said plurality of spreading codes a respective probability that said spreading code will be selected to modulate the communication signal, and
   wherein a spreading code to be multiplied with a second information bit of the communication signal is unknown when said first spreading code is selected.

26. The transmitter of claim 25, wherein the spreading code is selected for a duration equal to an information bit period.

27. The transmitter of claim 25, wherein the spreading codes are short-code CDMA sequences.

* * * * *